A. C. S. ANGEL.
DENTAL PLATE.
APPLICATION FILED JUNE 10, 1919.

1,354,938.

Patented Oct. 5, 1920.

Inventor:
Asmus C. S. Angel
By
Attorneys

UNITED STATES PATENT OFFICE.

ASMUS CHRISTENSEN SCHAU ANGEL, OF COPENHAGEN, DENMARK.

DENTAL PLATE.

1,354,938.  Specification of Letters Patent.  Patented Oct. 5, 1920.

Application filed June 10, 1919. Serial No. 303,097.

*To all whom it may concern:*

Be it known that I, ASMUS CHRISTENSEN SCHAU ANGEL, a subject of the King of Denmark, residing at Copenhagen, Denmark, have invented new and useful Improvements in Dental Plates; and I do hereby declare the following to be a full, clear, and exact description of the same.

Dental plates and other devices which are retained in their places by a vacuum chamber made of hard and soft rubber parts vulcanized together in such a manner that the part of the dental plate in which the artificial teeth are secured consists of hard rubber while the part of the plate fitting to the gum consists of a layer of soft rubber which is more appropriate for effecting the tight fit against the gum, are well known.

Dental plates of this kind suffer from the drawback that the gum or other part of the body is sucked more or less into the vacuum chamber and finally fills up the same so that its retaining effect ceases and in any case a detrimental irritation of the skin is caused. In order to avoid this drawback according to a well known method a helical spring or another appropriate porous or perforated filler has been used with the object of supporting the free part of the gum facing the vacuum chamber without, however, interfering essentially with the suction effect.

According to the invention I have now obtained a favorable result by extending the soft rubber layer forming the contact surface over the cavity or groove in the dental plate with a narrow slit therein without the suction effect being materially reduced, and this measure has proved to be sufficient for preventing the gum from being sucked into the vacuum chamber to an undue extent. The described device can also be used in connection with the well known helical spring or other filler.

Figure 1:
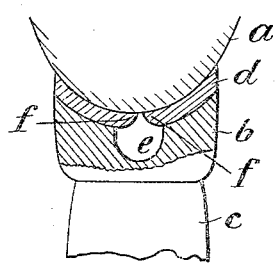
Figure 2:
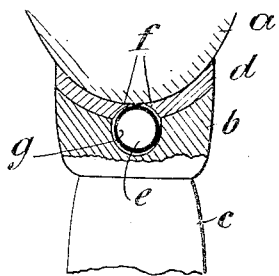

On the drawing annexed Figure 1 shows a section through part of a dental plate according to the invention and Fig. 2 a similar section through a modification in which the invention is combined with the known helical spring.

Referring now to Fig. 1 $a$ designates the gum, $b$ the part of the dental plate consisting of hard rubber and carrying the artificial teeth $c$, $d$ the soft rubber, having a slit therein the edges of which extend over part of the vacuum chamber or cavity $e$, as shown. The cleaning of the cavity can be effected through the slit. In spite of the fact that it should seem as if the lips $f$ did materially reduce the area effective for the retaining of the dental plate it has been proved in practice that the dental plate is retained practically just as strongly as a dental plate having a vacuum chamber of the same dimensions but without the lips described, while on the other hand the lips are able to prevent the gum from being sucked into the vacuum chamber to an undue extent.

Fig. 2 shows the device used in connection with a helical spring $g$ arranged in the vacuum chamber $e$ which is partially overlapped by the lips $f$. As the lips $f$, as explained above, are made of soft, *i. e.* yielding, rubber they do not prevent the removal and replacement of the spring through the narrow slit left between the edges of the lips.

Having thus fully described my invention, I claim as new and desire to secure by Letters Patent—

1. A dental plate adapted to be retained in its place on the gum by means of vacuum comprising a part consisting of hard rubber carrying the artificial teeth and having a cavity, a strip of soft rubber secured to the surface of the said part, and having a slit therein over the cavity, said strip being adapted to form a tight fit with the gum and to prevent movement of the gum into the cavity.

2. A dental plate adapted to be retained in its place on the gum by means of vacuum comprising a part consisting of hard rubber carrying the artificial teeth and having a cavity, a strip of soft rubber secured to the surface of the said part, and having a slit therein over the cavity, said strip being adapted to form a tight fit with the gum, and a filler accommodated in the said cavity and supporting the edges of the said strip.

In testimony whereof I have affixed my signature in presence of two witnesses.

ASMUS CHRISTENSEN SCHAU ANGEL.

Witnesses:
  C. W. ELLSKOW,
  A. TORSTENJAU.